M. DASH.
DRAIN PIPE CLEANER.
APPLICATION FILED JULY 18, 1917.
1,254,125.
Patented Jan. 22, 1918.
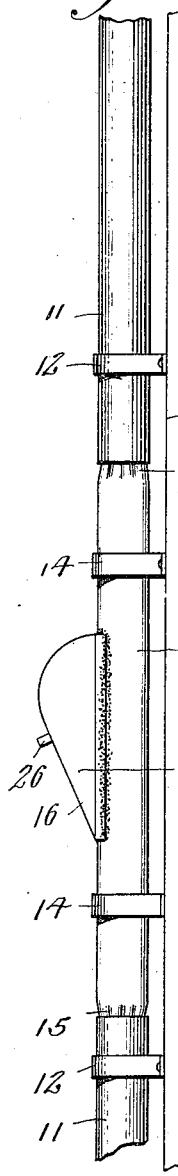
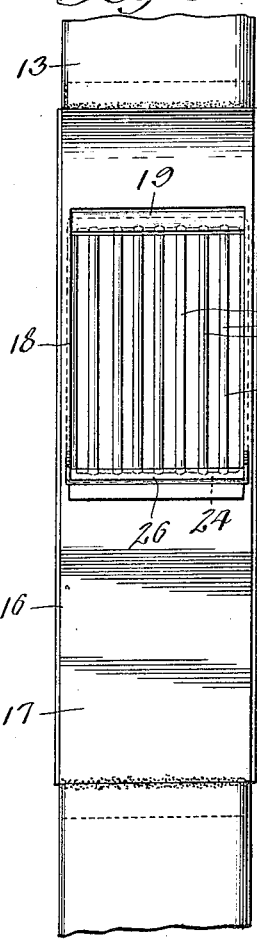
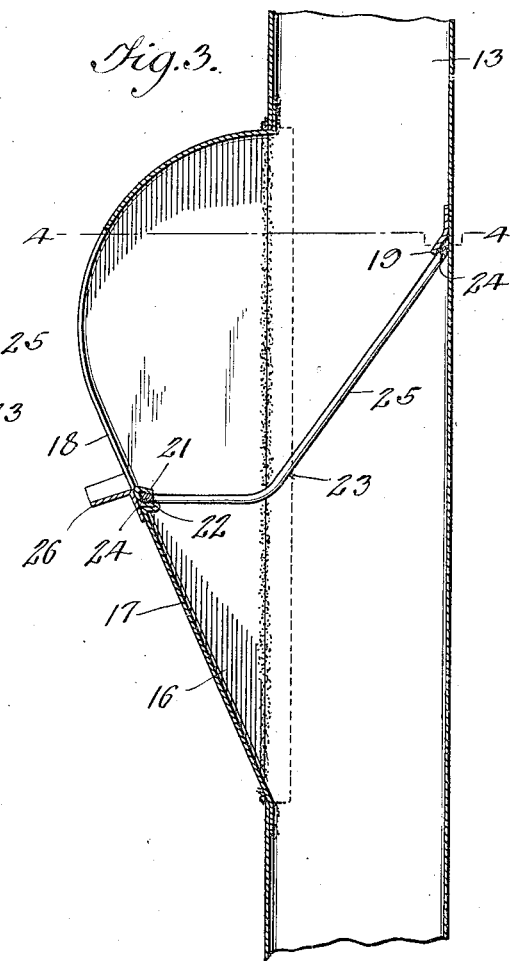
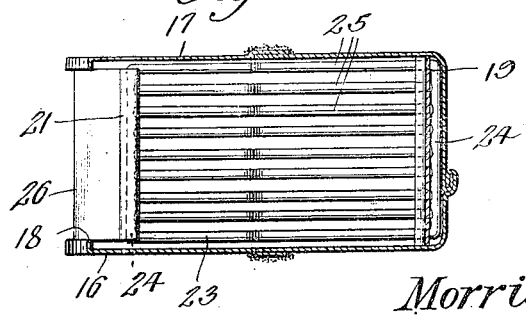
WITNESS
Frederick W. Ely
INVENTOR
Morris Dash,
BY Victor J. Evans
ATTORNEY

UNITED STATES PATENT OFFICE.

MORRIS DASH, OF PHILADELPHIA, PENNSYLVANIA.

DRAIN-PIPE CLEANER.

1,254,125.  Specification of Letters Patent.  Patented Jan. 22, 1918.

Application filed July 18, 1917. Serial No. 181,357.

*To all whom it may concern:*

Be it known that I, MORRIS DASH, a citizen of the United States, residing at 216 N. 5th street, Philadelphia, in the county of Philadelphia and State of Pennsylvania, have invented new and useful Improvements in Drain-Pipe Cleaners, of which the following is a specification.

The invention relates to drain pipes and has for an object to provide a device for use in connection with leaders and other forms of drain pipes for use in preventing foreign matter passing down a drain pipe with the water or other fluid from stopping up or clogging the drain pipe or an adjacently disposed trap or the like.

The invention comprehends more particularly a construction for use on house leaders and the like, designed and arranged to divert the course of foreign matter passing down the drain pipe with the water, so that the foreign matter will be projected out of the drain pipe at a certain point, and not pass on down into a trap, where it would clog the same.

Further the invention comprehends a device which permits of cleaning out the accumulated foreign matter at a certain point within easy reach, and thus keep drain pipes and traps clear from stones, dirt, straw or other similar foreign matter that ofttimes is collected on the roof of a house with the down coming rain, and ordinarily would pass on down through the leader or drain pipe and lodge somewhere therein, or in the trap or other conduit.

In the further disclosure of the invention reference is to be had to the accompanying drawings, constituting a part of this specification, and in which similar characters of reference denote corresponding parts in all the views, and in which—

Figure 1 is a fragmentary side elevation of the drain pipe, showing my invention applied thereto.

Fig. 2 is a front elevation, showing in fragment a portion of the invention.

Fig. 3 is a vertical sectional view taken through the structure shown in Fig. 2, and Fig. 4 is a horizontal sectional view taken on the line 4—4 of Fig. 3.

Referring more particularly to the views, the numeral 10 indicates the wall or side of a house on which is arranged the usual drain pipe or leader 11, supported by suitable brackets 12. Interposed between adjacent sections of the drain pipe 11 is a section 13 secured by suitable brackets 14, and which is cylindrical and substantially of the shape of the drain pipe or leader, but has its ends 15 tapered, so as to fit into the ends of the drain pipe, said section furthermore having an enlarged medial head or chamber 16, formed by a bulged portion 17, which also has an opening 18, said bulged portion lying outside of the medial line of the section 13. This bulged portion may be soldered or otherwise secured to the main section, and in the interior of the section 13 there is suitably secured or otherwise formed a ledge or extension 19, with a similar extension 21 in the bulged portion 17, also formed with a ledge 22. A wire netting or screen element 23, formed by end pieces 24 and parallel wire strands 25 secured in the end pieces 24, is arranged to have one end fitted beneath the extension 19, and the other end extending into the chamber 16, but sprung between the ledge 22 and extension 21, so that the screen element 23 will be securely held in the path of any fluid coming down the leader or drain pipe and through the section 13. Adjacent the lower part of the screen element, and where it connects with the bulged portion 17, there is suitably secured upon said bulged portion adjacent the opening 18, a gutter 26 which may be of any desired form of construction, and which prevents downcoming fluid or debris from clinging to the side of the leader or drain pipe, this also being accomplished by having the bulged portion 17 shaped and formed, as shown, so that the fluid or foreign matter may fall directly to the ground without touching the leader or drain pipe or any part thereof.

From the foregoing it will be seen that any foreign matter coming down the drain pipe when it passes through the section 13, will be caught by the screen element 23, which due to its particular shape will cause the foreign matter to accumulate in the chamber 16, where it can be readily removed, or the further on-rush of water down the leader will of itself give sufficient impetus to force the collected foreign matter out through the opening 18.

With a device of the character described applied to a drain pipe or other fluid-conducting conduit, it will be apparent that there is provided what might practically be termed a self-cleaning drain pipe, in that the foreign matter coming down the drain pipe with the fluid, will be collected at the point of placement of the screen, and due to the force of the fluid will be ejected out from the chamber through the opening thereof, thus accomplishing the self-cleaning feature mentioned.

From the foregoing it will be seen that the device described is of simple construction, and consists of few parts; can be cheaply manufactured, and will effectively accomplish the purpose for which it is desired.

Having described my invention I claim:

A device of the class described comprising a pipe section having an opening therein, an offset portion adjacent said opening, a ledge formed on the pipe wall opposite said opening and above the offset portion, a second ledge formed at the upper end of said offset portions, a screen composed of curved bars having their ends held by said ledges, and a gutter projecting outwardly from the top of the offset portion and flush with the lower end of the screen.

In testimony whereof I affix my signature.

MORRIS DASH.

Copies of this patent may be obtained for five cents each, by addressing the "Commissioner of Patents, Washington, D. C."